US010781775B2

(12) United States Patent
Avireddi et al.

(10) Patent No.: US 10,781,775 B2
(45) Date of Patent: Sep. 22, 2020

(54) CALIBRATION-FREE MASS AIRFLOW SENSOR

(71) Applicant: Hitachi Automotive Systems Americas, Inc., Harrodsburg, KY (US)

(72) Inventors: Prashanth Avireddi, Farmington, MI (US); Anthony Boone, Westland, MI (US); Frank Hunt, West Bloomfield, MI (US); Naoki Oka, Lexington, KY (US); Zachariah Rabatah, Farmington Hills, MI (US)

(73) Assignee: HITACHI AUTOMOTIVE SYSTEMS AMERICAS, INC., Harrodsburg, KY (US)

( * ) Notice: Subject to any disclaimer, the term of this patent is extended or adjusted under 35 U.S.C. 154(b) by 99 days.

(21) Appl. No.: 15/884,671

(22) Filed: Jan. 31, 2018

(65) Prior Publication Data

US 2019/0234356 A1    Aug. 1, 2019

(51) Int. Cl.
| | |
|---|---|
| *F02M 35/10* | (2006.01) |
| *F02M 35/02* | (2006.01) |
| *F02M 35/024* | (2006.01) |
| *G01F 1/684* | (2006.01) |
| *G01F 1/78* | (2006.01) |

(52) U.S. Cl.
CPC .... *F02M 35/10386* (2013.01); *F02M 35/024* (2013.01); *F02M 35/0205* (2013.01); *F02M 35/10144* (2013.01); *F02M 35/10262* (2013.01); *G01F 1/6842* (2013.01); *G01F 1/78* (2013.01)

(58) Field of Classification Search
CPC ....... F02M 35/10386; F02M 35/10262; F02M 35/024; F02M 35/0205; F02M 35/10144; G01F 1/78; G01F 1/6842
See application file for complete search history.

(56) References Cited

U.S. PATENT DOCUMENTS

| | | | |
|---|---|---|---|
| 5,253,617 A | 10/1993 | Fitzpatrick et al. | |
| 5,922,970 A | 7/1999 | Ohle | |
| 6,240,775 B1 * | 6/2001 | Uramachi | G01F 1/6842 73/114.34 |

(Continued)

FOREIGN PATENT DOCUMENTS

| | | | | |
|---|---|---|---|---|
| DE | 19637647 A1 * | 3/1998 | ........... | G01F 1/6842 |
| DE | 102004045114 A1 | 10/2005 | | |
| WO | WO-9821554 A1 * | 5/1998 | ........... | G01F 1/6842 |

*Primary Examiner* — Jacob M Amick
*Assistant Examiner* — Charles Brauch
(74) *Attorney, Agent, or Firm* — Mattingly & Malur, PC (57) ABSTRACT

In some examples, a mass airflow sensor apparatus includes a housing having a tubular bore for passage of air, with an airflow sensor disposed at least partially within the tubular bore. The airflow sensor may be configured to measure a flow rate of air flowing past the airflow sensor. A focus component may be disposed upstream of the mass airflow sensor, the focus component including a cylindrical tubular focus member suspended within the bore. Further, a nozzle may be disposed upstream of the focus component. The nozzle may include a conical inner surface angled toward a center of the bore. In addition, a grid component may be disposed upstream of the focus component. The grid component may include a mesh grid including a plurality of openings for smoothing a flow of air flowing toward the airflow sensor.

19 Claims, 10 Drawing Sheets

(56) References Cited

U.S. PATENT DOCUMENTS

| | | |
|---|---|---|
| 6,401,531 B1 | 6/2002 | Tank et al. |
| 6,920,784 B2 | 7/2005 | Abdolhosseini et al. |
| 7,036,366 B2 | 5/2006 | Emmert, Jr. et al. |
| 8,707,770 B2 | 4/2014 | Itakura |
| 2013/0061684 A1 | 3/2013 | Frauenholz et al. |

* cited by examiner

CALIBRATION-FREE MASS AIRFLOW SENSOR

BACKGROUND

Information regarding the mass of air being received through a vehicle air induction system may be used by an engine controller, such as an engine control unit (ECU), to balance and deliver the correct fuel mass to the engine cylinders for ensuring efficient engine operation. In internal combustion engine applications, air density varies with the ambient temperature, altitude, and the use of forced induction. Accordingly, mass flow sensors are more useful than volumetric flow sensors for determining the quantity of intake air provided to the cylinders of an internal combustion engine.

The configuration of the air induction system significantly influences the accuracy of conventional mass airflow (MAF) sensors. For instance, the shape of the air induction system and features of other components, such as the filter, resonator, etc., affect the flow dynamics of the air passing through the air induction system, which, in turn, affects the accuracy of calibration of the MAF sensor. For example, each time an air box and/or filter is designed or modified for a vehicle, a conventional MAF sensor must be recalibrated to determine a new master transfer function (MTF) for the new air induction system configuration. The MTF is used by the engine controller for determining the airflow mass during operation of the engine. Accordingly, if the MTF is not accurate due to improper calibration, the engine may not function properly and/or may not meet emission standards. The calibration process for conventional MAF sensors occupies a large amount of time in the vehicle development process and can lead to program delays and added costs.

SUMMARY

Some implementations include arrangements and techniques for a mass airflow sensor apparatus that reduces or eliminates calibration in some applications. In some examples, the mass airflow sensor apparatus includes a housing having a tubular bore for passage of air, with an airflow sensor disposed at least partially within the tubular bore. The airflow sensor may be configured to measure a flow rate of air flowing past the airflow sensor. A focus component may be disposed upstream of the mass airflow sensor. The focus component may include a cylindrical tubular focus member suspended within the tubular bore. Further, a nozzle may be disposed upstream of the focus component. The nozzle may include a conical inner surface angled toward a center of the bore. In addition, a grid component may be disposed upstream of the focus component. The grid component may include a mesh grid including a plurality of openings for smoothing a flow of air flowing toward the airflow sensor.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The technology herein includes novel arrangements and techniques for minimizing or eliminating calibration and/or recalibration of a MAF sensor associated with a vehicle air induction system. The MAF sensor may be incorporated into a MAF sensor apparatus. The MAF sensor apparatus according to some examples herein includes a grid component, a nozzle component, and a focus component all positioned upstream of the MAF sensor to promote airflow uniformity, such as laminar flow and a uniform velocity profile, at the location of the sensor.

In one example configuration, the MAF sensor apparatus includes a tubular housing with the grid component located at an intake end. The nozzle component may be disposed immediately downstream of the grid component and the focus component may be disposed downstream and at a first distance from the nozzle exit. Further, the MAF sensor may be disposed at a second distance from the outlet side of the focus component for measuring the air mass flow rate passing through the airflow system.

The grid component may include a grid mesh structure that increases airflow uniformity through the MAF sensor apparatus by making the airflow more laminar. Furthermore, the nozzle component may reduce any disturbances in the airflow and may direct the air toward a central bore of the housing and toward the focus component, which provides a laminar flow to the MAF sensor. By increasing the flow uniformity at the MAF sensor regardless of different upstream configurations for the air induction system, and regardless of the air velocity, implementations herein are able to nullify the effects of variations in the design of the air induction system, and may reduce or eliminate the need for calibration or recalibration of the MAF sensor for each and every different automobile configuration and/or induction system configuration with which the MAF sensor apparatus is used.

Implementations provide an improvement over conventional MAF sensors used for measuring the airflow supplied to the cylinders of an internal combustion engine. For example, some implementations may eliminate the calibration process associated with development and installation of MAF sensors in a vehicle engine. By eliminating the calibration process, the MAF sensor apparatus herein reduces the amount of labor hours required for calibration, reduces the time delay waiting for calibration to be completed, and thereby decreases the time required for developing or reconfiguring an engine, vehicle, and/or air induction system. For example, MAF sensor calibration may be a bottleneck in the vehicle development process due to the requirement for recalibrating conventional MAF sensors in response to any changes in the air induction system, even if such changes are only minor. Accordingly, implementations herein may help reduce the design time associated with designing an air induction system and may provide flexibility for creating air induction systems that are efficient and robust in nature. In addition, in some examples, the MAF sensor apparatus herein may dampen pressure pulsations in the airflow.

As one example of operation of the MAF sensor apparatus herein, air drawn into the air induction system encounters the grid mesh of the grid component. The grid mesh may serve to dampen any disturbances in the airflow received from the filter enclosure or other upstream components. The design of the grid mesh may include several variables to consider. For example, the size of each mesh cell opening in the grid may be selected to be small enough to laminarize the airflow through the mesh cell at the expected ranges of airflow velocity through the air induction system. However, it is desirable that the mesh cell not be so small as to substantially increase the velocity of flow to a value so high that it may result in the generation of vortices at the exit of the grid structure, which may cause the MAF sensor to locally experience a high degree of disturbance or turbulence. In addition, a thickness of the grid mesh in the grid component may be selected to control the intensity and or randomness of disturbances in the air induction system upstream of the MAF sensor apparatus, while also considering the amount of back pressure and the overall size of the MAF sensor apparatus that may result from a grid component having a thicker mesh thickness.

The air may exit the grid component directly into the nozzle component where the velocity of the airflow is increased. In some examples, there may be a space between the grid exit and the nozzle entrance. The inlet of the nozzle has the same approximate diameter as the MAF apparatus housing and/or the air induction pipe (duct) of the air induction system. The nozzle component may have a generally conical inner surface so that a diameter of the outlet of the nozzle is smaller than the inlet. The nozzle increases the velocity of the airflow through the CFM apparatus and helps to ensure that large vortices or other disturbances are not generated upstream of the MAF sensor. Following exiting the nozzle component, the air is directed through the focus component, which may serve to further increase the velocity, while also smoothing the airflow that will contact the MAF sensor before the airflow reaches the MAF sensor. Furthermore, while one example, has been discussed above, alternative configurations of the MAF sensor apparatus are contemplated herein, as discussed additionally below.

The geometric parameters, e.g., the size and shape of the grid component, nozzle component, and focus component, are empirically related to the bore size of the air induction system and the air induction system velocity profile. The distance of the grid component from the nozzle component and the MAF sensor may be dependent at least partially on the packaging size of the air induction system in the vehicle. Further, the openings in the grid mesh may include any of following forms: rectangular (including square); hexagonal (i.e., honeycomb), triangular, diamond-shape, or alternatively, in some cases, the grid component may be or may include a wire mesh screen.

Furthermore, implementations herein may include usage of multiple grid components, such as spaced apart from each other, to increase the flow uniformity in the air induction system. The grid component, nozzle component and the focus component may be constructed of metallic or non-metallic materials, depending at least partially on the harshness of the environment in which these components are to be installed as well as taking into consideration manufacturability, durability, and cost. In some cases, the grid component, nozzle component, and the focus component may be manufactured as a single contiguous piece of equipment, while in other cases, these components may be manufactured as multiple separate pieces, depending at least partially on the air induction system configuration, ease of manufacture, and cost. Further, the grid component, the nozzle component, and the focus component may be located at any of a variety of locations within the air induction system upstream of the MAF sensor, and are not limited to being located immediately adjacent to or within the same housing as the MAF sensor. However, for ease of discussion, the components discussed above and/or other components as discussed below may be referred to as a MAF sensor apparatus henceforth in this document.

The MAF sensor apparatus herein may be applied to new designs for air induction systems and or changes to existing air induction systems. For instance, an air induction system may include numerous design variables such as filter enclosure size and shape, filter size and shape, filter pleat design, resonator size and shape, duct length or shape, and so forth. Changes to any of these design variables may affect the airflow profile at the MAF sensor and may therefore require determination of a new calibration curve for conventional MAF sensors. On the other hand, implementations of the MAF sensor apparatus described herein may reduce or eliminate the calibration and recalibration process, thereby providing savings in terms of labor, testing equipment usage, and development time.

For discussion purposes, some example implementations are described in the environment of an air induction system for an internal combustion engine. However, implementations herein are not limited to the particular examples provided, and may be extended to other service environments or for other applications, as will be apparent to those of skill in the art in light of the disclosure herein.

Figure 1:
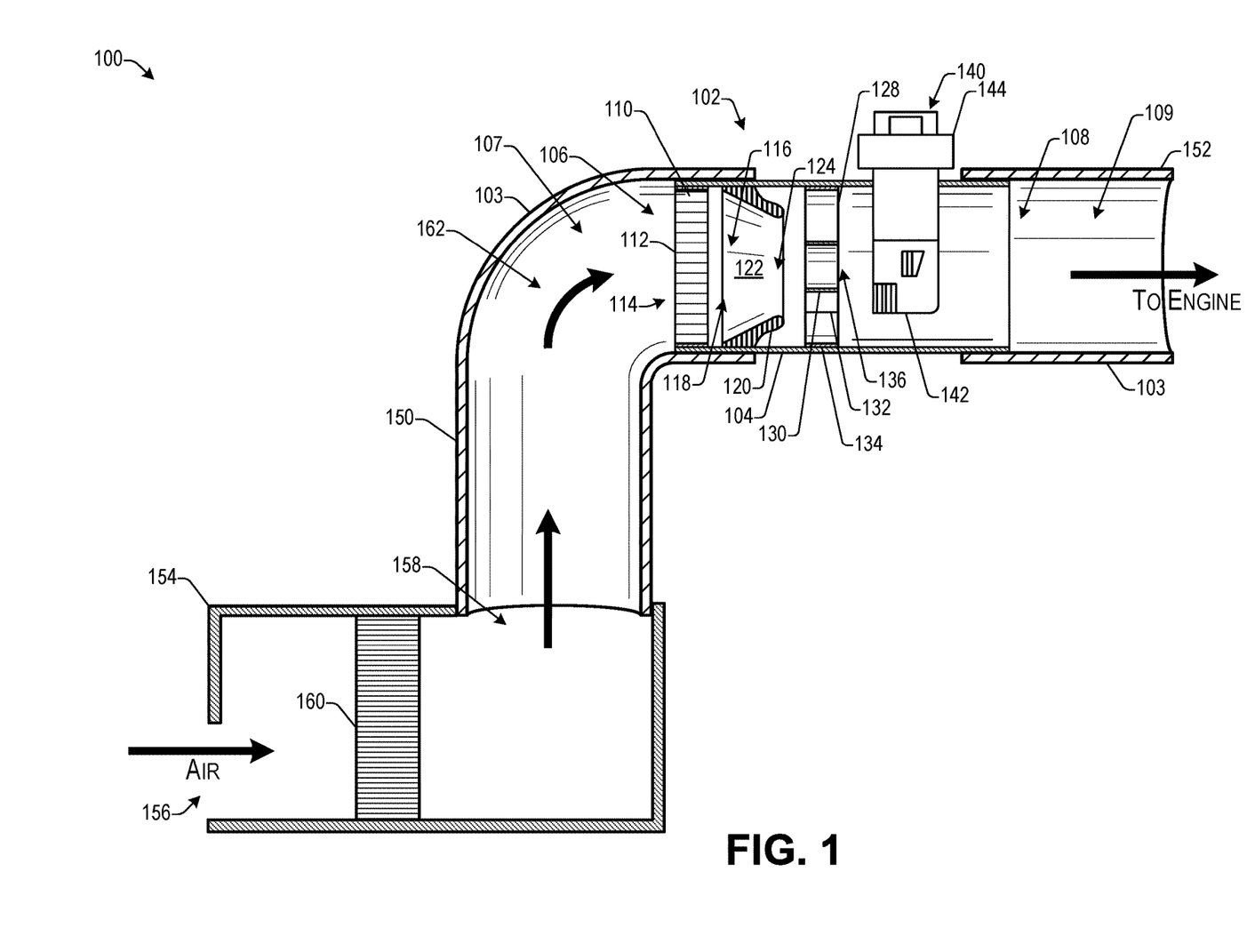
FIG. 1 illustrates a cross sectional view of an example induction system with a MAF sensor apparatus according to some implementations.

FIG. 1 illustrates a cross sectional view of an example air induction system 100 with a MAF sensor apparatus 102 according to some implementations. The MAF sensor apparatus 102 includes a tubular housing 104, which may be cylindrical or any other desired shape in cross section. The housing 104 may be made out of metal, polymer, ceramic, composite, or other suitable material, and includes an inlet end 106 on an upstream side 107, and an outlet end 108 on a downstream side 109. Further, in other examples, the duct 103 of the air induction system may serve as part or all of the housing 104. Accordingly, the duct 103 may be considered to be equivalent to and encompassed by the term housing herein in those examples in which a separate housing is not used.

A grid component 110 is located at the inlet end 106 of the housing 104. The grid component 110 includes a grid mesh 112 comprised of a plurality of cells or openings, which may be generally uniform in size in some examples. Airflow passing through the air induction system 100 may enter the grid mesh 112 on an inlet side 114 of the grid component 110 and may exit the grid mesh 112 on an exit side 116 of the grid component 110.

The exit side 116 of the grid component 110 may be upstream of an inlet opening 118 of a nozzle component 120. In some examples, the inlet opening 118 of the nozzle component 120 may be immediately adjacent to the exit side 116 of the grid component. In other examples, as illustrated, there may be a space between the exit side 116 of the grid component 110 and the inlet opening 118 of the nozzle component 120.

The nozzle component 120 may include a generally conical inner surface 122 that leads to an exit opening 124 of the nozzle 120. Accordingly, the inlet opening 118 of the nozzle 120 may have a larger diameter than the exit opening 124 of the nozzle 120. For instance, the inlet opening 118 of the nozzle 120 may have a diameter that is substantially the same as an outer diameter of the grid component 110 and slightly smaller than an inner diameter of the housing 104 and/or the duct 103.

A focus component 128 may be located downstream of the nozzle exit opening 124 and may include a cylindrical tubular focus member 130 suspended in the center of the focus component 128 by one or more struts 132 extending inward from an outer cylindrical member 134. An outlet side 136 of the focus member 130 directs the airflow toward a MAF sensor 140. In this example, the MAF sensor 140 is illustrated as a hot wire type MAF sensor although implementations herein are not limited to any particular type of MAF sensor 140. For example, the MAF sensor 140 may be a silicon based MAF sensor or other type of MAF sensor.

In the case of a hot wire MAF sensor, the sensor may be used to determine the mass of air flowing past the sensor by heating a wire (not shown in FIG. 1) contained in an air inlet portion 142 with either a constant voltage over the wire or a constant current through the wire. The electrical resistance of the wire increases as the temperature of the wire increases, which varies the electrical current flowing through the wire. As air flows over the wire, the air cools the wire, thereby decreasing the resistance of the wire, which allows more current to flow through the wire. As one example, by holding the supply voltage constant, as more current flows through the wire, the temperature of the wire increases until the resistance reaches equilibrium again. The increase or decrease in current may be proportional to the mass of air flowing past the wire.

In some cases, an integrated electronic circuit located in an upper portion 144 of the MAF sensor 140 may convert the proportional measurement to a calibrated signal that is sent to the engine controller (e.g., an ECU) to indicate the current airflow mass. The engine controller may control the amount of fuel injected into the engine based on the airflow mass to maintain an optimal air/fuel ratio. Furthermore, if the air density increases due to a pressure increase or a temperature drop, but the air volume remains constant, the denser air will remove more heat from the wire indicating a higher mass airflow. Accordingly, the hot wire MAF sensor 140 is able to respond directly to changes in air density.

In the system of FIG. 1, the MAF sensor apparatus 102 is connected to a tubular inlet duct 150 and a tubular outlet duct 152. The inlet duct 150 is connected to the inlet end 106 of the MAF sensor apparatus 102. The inlet duct 150 receives air from a filter enclosure 154 that includes an air inlet 156, an air outlet 158, and a filter 160 located between the air inlet 156 and the air outlet 158. As is known in the art, the filter 160 may filter the air being drawn into the engine through the air induction system 100. In this example, the inlet duct 150 includes a 90-degree bend, as indicated at 162, for delivering air to the inlet end 106 of the MAF sensor apparatus 102. However, implementations herein are not limited to any particular configuration for the inlet duct 150 or the outlet duct 152.

The outlet duct 152 is connected to the outlet end 108 of the MAF sensor apparatus 102. The outlet duct 152 may deliver the airflow to the engine (not shown in FIG. 1) following sensing of the air mass by the MAF sensor 140. Furthermore, other components may be included in the air induction system 100, as is known in the art. For example, a supercharger or turbocharger may be located on the upstream side 107 or downstream side 109 of the MAF sensor apparatus 102, such as between the filter enclosure 154 and the MAF sensor apparatus 102. Furthermore, a resonator may be located on the upstream side 107 or the downstream side 109 of the MAF sensor apparatus 102.

Figure 2A:
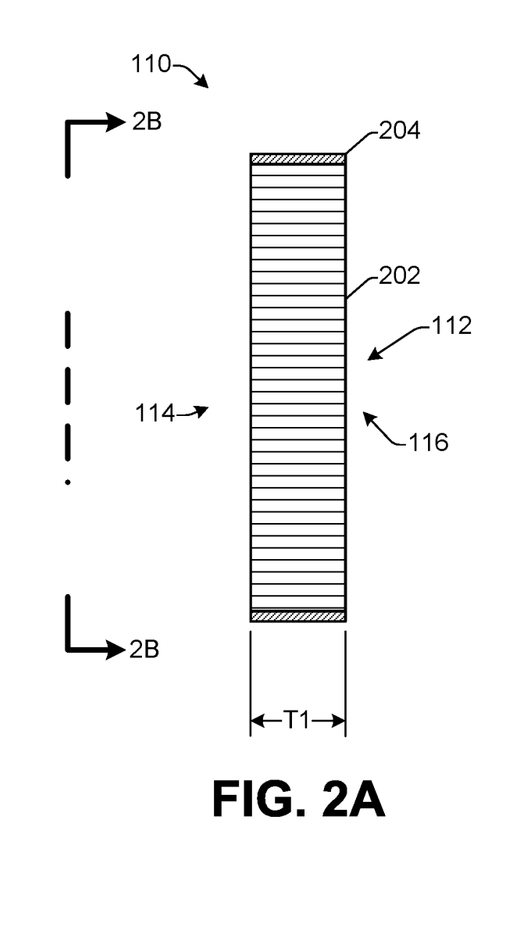
FIGS. 2A and 2B illustrate example enlarged views of the grid component according to some implementations.
Figure 2B:
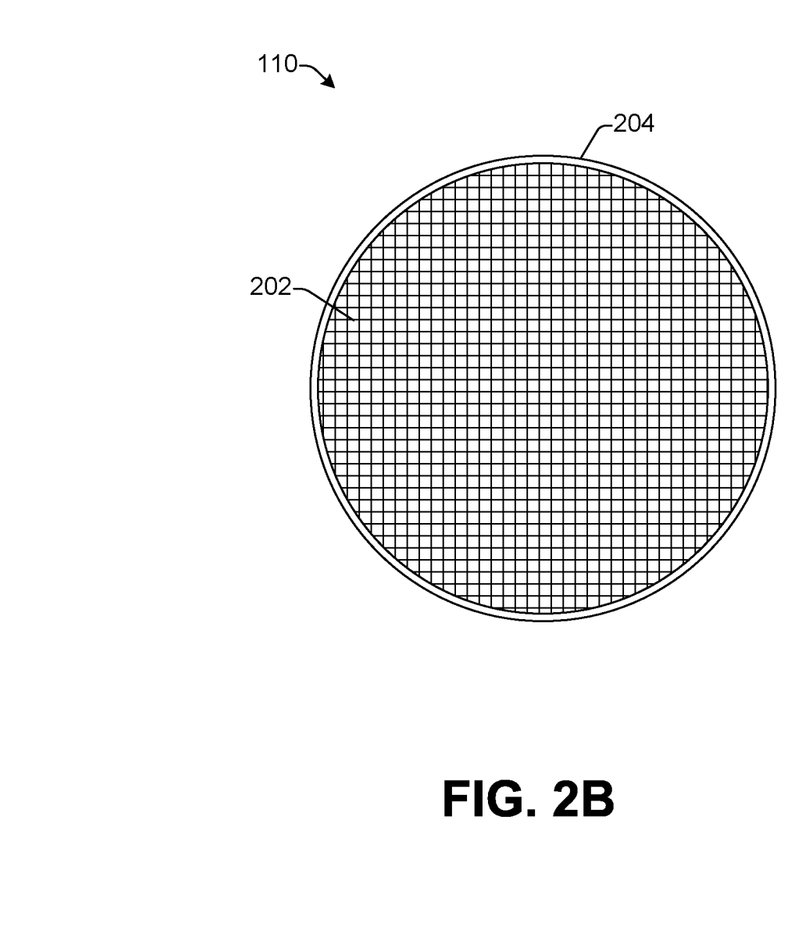

FIGS. 2A and 2B illustrate example enlarged views of the grid component 110 according to some implementations. FIG. 2A is an enlarged side view of the grid component of FIG. 1; and FIG. 2B is a plan view of the grid component 110 as viewed along line 2B-2B of FIG. 2A. As mentioned above, the grid component 110 includes the grid mesh 112 comprised of a plurality of cell openings 202, which may be generally uniform in size in some examples. Airflow passing through the air induction system 100 may pass through the openings 202 of the grid mesh 112 from one side of the grid component 110 to the other. Accordingly, each opening 202 is shaped as a small tunnel having an opening 202 with a height and width of between approximately four and seven millimeters, and a length that is equal to a thickness T1 of the mesh component 110. In some examples herein, the thickness T1 may be greater than the height and/or width of the openings 202. For example, the thickness T1 may be between 5 and 20 mm in some examples, although implementations herein are not limited to any particular thickness T1. For instance, a greater thickness T1 may provide a more laminar flow, but may also increase back pressure and increase velocity of the flow.

Furthermore, while the inlet side 114 and the outlet side 116 are illustrated in this example, the grid component 110 may be symmetrical such that the inlet side and the outlet side may be reversed by flipping over the grid component 110, or the like, without affecting the performance of the grid component 110. The grid mesh 112 may be retained within a cylindrical ring 204 that may serve to support the grid mesh 112 and maintain the grid mesh 112 within the housing 104 discussed above with respect to FIG. 1.

In this example, the grid openings 202 are illustrated as having a square or other rectangular shape. Alternatively, as discussed above, the grid openings 202 may be hexagonal, triangular, diamond-shaped, circular, or other desired shapes. As another example, a wire mesh may be used in place of the grid component 110 in some cases. For instance, wire mesh, hexagons, or other shapes may be used with an efficiency similar to that of the illustrated rectangular grid. For example, a hexagonal grid mesh, a wire mesh and/or the other shapes discussed above may also serve to laminarize the airflow as the airflow passes through the small grid mesh channels or wire mesh without creating create large vortices, thereby preventing the airflow exposed to the flow MAF sensor from having any large disturbances.

In some examples, the decision as to whether to select a mesh with rectangular openings, hexagonal openings, etc., or a wire mesh, may be dependent, at least partially, on a harshness of the airflow conditions, a reliability life cycle, packaging, and cost. For instance, in some examples, the results may be the same for the same configurations for different setups, i.e., a MAF apparatus with a wire mesh may differ from a MAF apparatus with a rectangular grid in that the overall dimensions may be different and the distance of the respective grids from the MAF sensor may be different.

Accordingly, MAF apparatuses herein may be optimized differently for rectangular grids, hexagonal grids, etc., and/or mesh grid(s) based on empirical relationships between grid geometry, housing diameter, and the distance of the grid component from the MAF sensor. Nevertheless, a choice for the grid structure may be made for the calibration free MAF sensor apparatus herein based on optimization of the above-discussed parameters.

Figure 3A:
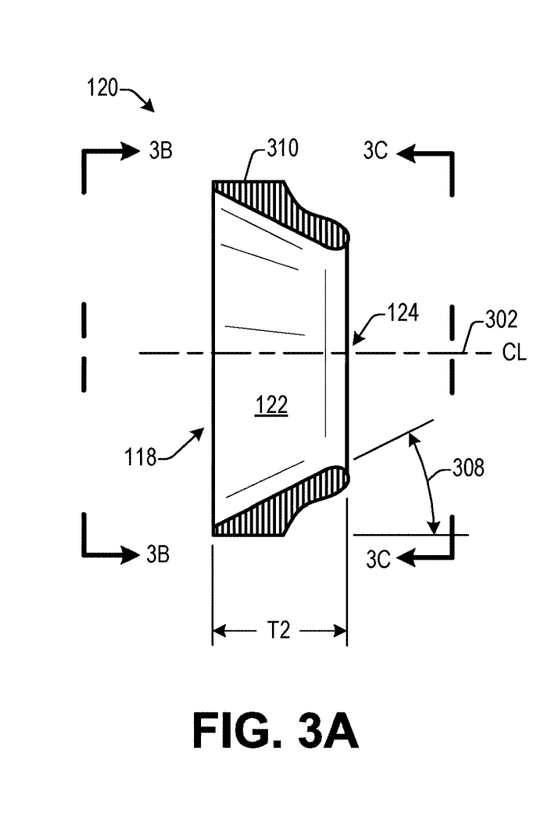
FIGS. 3A-3C illustrate example enlarged views of the nozzle component according to some implementations.
Figure 3B:
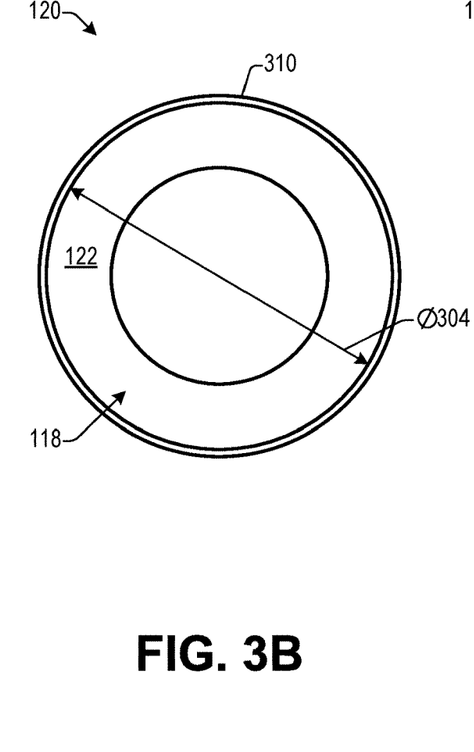
Figure 3C:
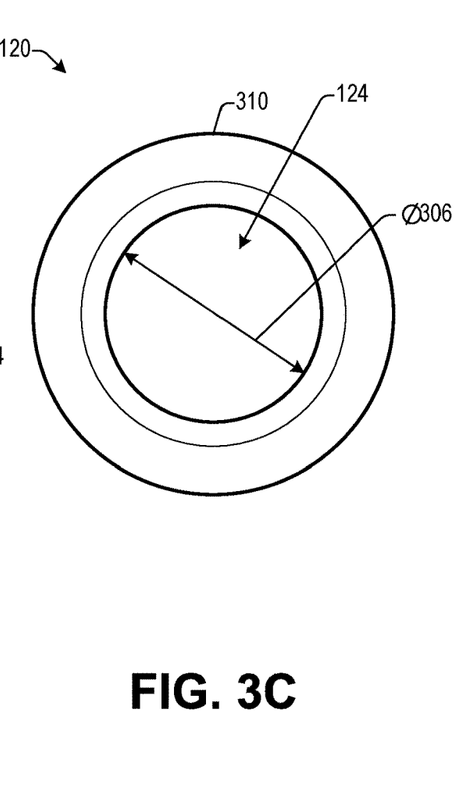

FIGS. 3A-3C illustrate example enlarged views of the nozzle component 120 according to some implementations. In this example, FIG. 3A illustrates an enlarged cross-section view of the nozzle component 120; FIG. 3B illustrates a plan view of the nozzle component 120 as viewed along line 3B-3B of FIG. 3A; and FIG. 3C illustrates a plan view of the nozzle component 120 as viewed along line 3C-3C of FIG. 3A. As mentioned above, the nozzle component 120 includes an inlet opening 118 and an exit opening 124. The nozzle component 120 may include a generally conical inner surface 122 that leads to the exit opening 124, and that is conical around a center line 302, which may correspond to a centerline of the housing and duct bores, as discussed additionally below. Accordingly, the inlet opening 118 of the nozzle 120 may have a larger diameter 304 than a diameter 306 of the exit opening 124 of the nozzle 120. For instance, the inlet opening 118 of the nozzle 120 may have a diameter 304 that is substantially the same as the inner diameter of the outer ring 204 of the grid component 110, as discussed above with respect to FIG. 2 and slightly smaller than an inner diameter of the housing 104. The exit opening 124 of the nozzle 120 may have a diameter 306 that is less than ¾ of the diameter 304 of the inlet opening 118, but greater than ½ of the diameter 304 of the inlet opening 118.

Furthermore, the nozzle component 120 may have a thickness T2 that may be selected at least in part to ensure that the airflow is not substantially disrupted, e.g., by the angle 308 of the inner surface 122 of the nozzle component 120 being too steep and thereby causing disruptions in the airflow. For example, the angle 308 of the inner surface 122 of the nozzle component 120 may be between 15 and 40 degrees with respect to the inner wall of the housing 104 (not shown in FIGS. 3A-3C). Furthermore, the nozzle 120 may include a flat cylindrical outer surface 310, which may enable the nozzle component 120 to be supported by the inner wall of the housing 104.

Figure 4A:
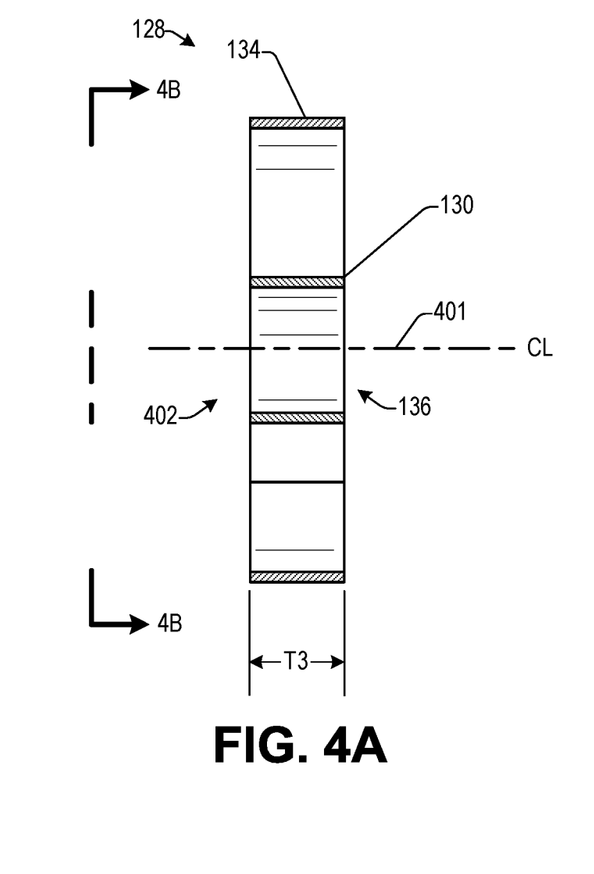
FIGS. 4A and 4B illustrate example enlarged views of the focus component according to some implementations.
Figure 4B:
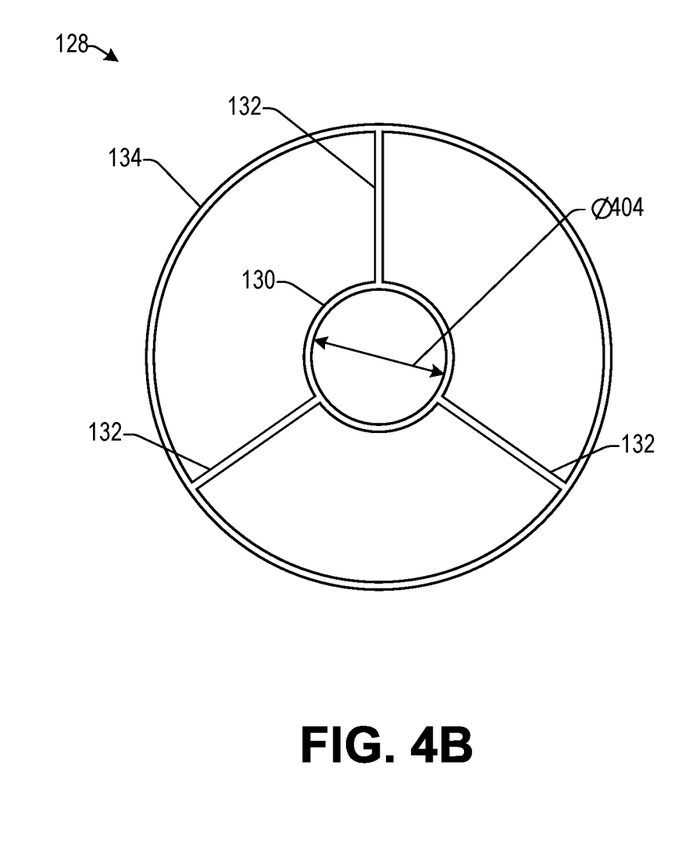

FIGS. 4A and 4B illustrate example enlarged views of the focus component according to some implementations. FIG. 4A illustrates an enlarged cross-sectional view of the focus component 128; FIG. 4B illustrates a plan view of the focus component 128 as viewed along line 4B-4B of FIG. 4A. As mentioned above, the focus component 128 may include a cylindrical tubular focus member 130 suspended in the center of the focus component 128 by one or more struts 132 extending inward from an outer cylindrical member 134. For instance, a centerline 401 of the focus member 130 may correspond to a centerline of the bore of the housing (or duct) and may further correspond to an air inlet of the MAF sensor 140 (not shown in FIGS. 4A and 4B). An outlet side 136 of the focus member 130 directs the airflow toward the MAF sensor 140. Furthermore, in some examples, the focus component 128 may be symmetrical such that an inlet side 402 and the outlet side 136 may be reversed without affecting the functionality of the focus component 128.

Furthermore, while three struts 132 are illustrated in this example, there may be more or fewer struts 132 as long as the focus member 130 is securely suspended in the center of the focus component 128. Furthermore, in some cases, the focus member 130 may be conical rather than cylindrical to provide a nozzle shape that further focuses a portion of the airflow on the MAF sensor.

Figure 5:
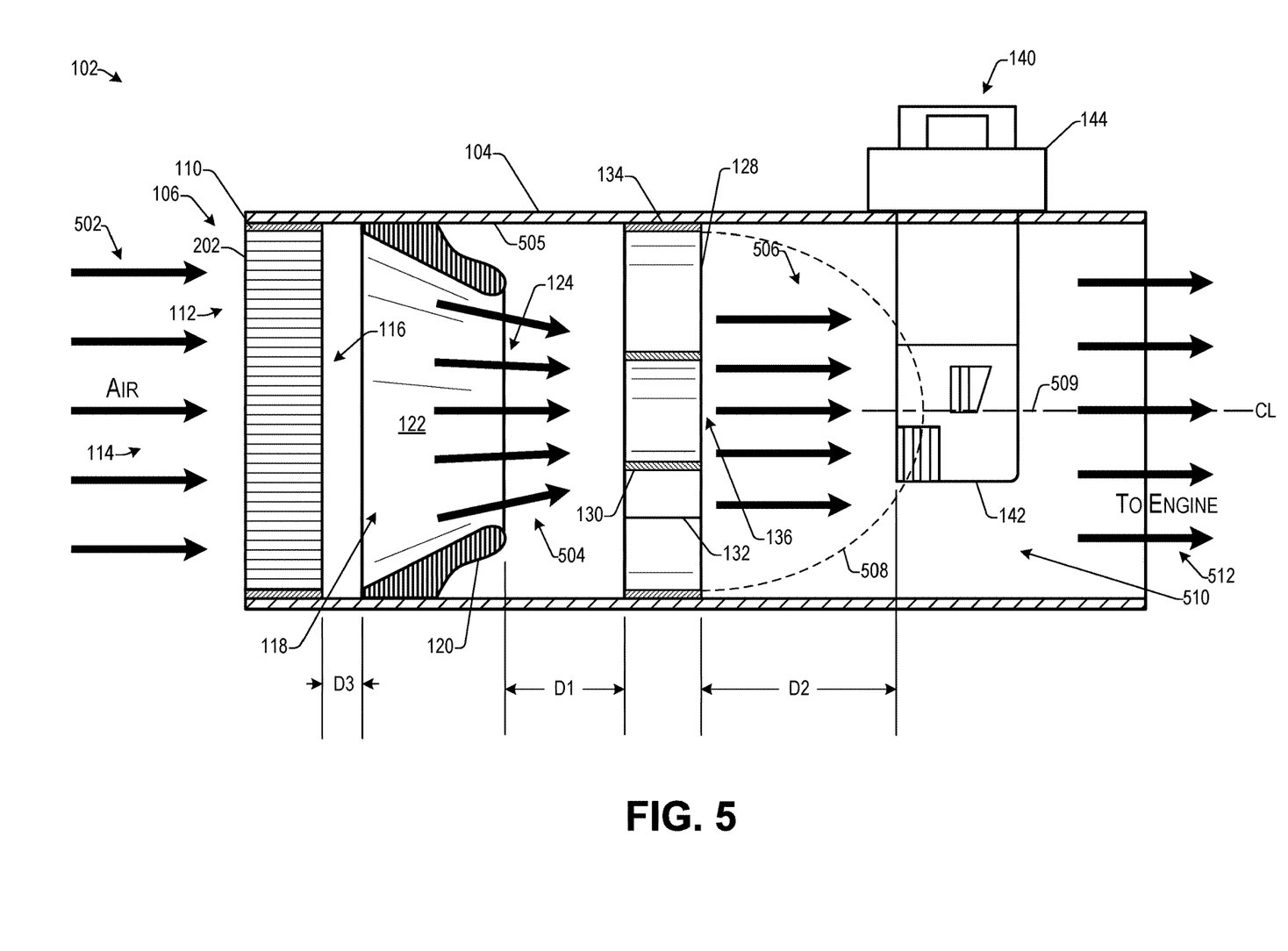
FIG. 5 illustrates an enlarged cross-sectional view of the MAF sensor apparatus according to some implementations.

FIG. 5 illustrates an enlarged cross-sectional view of the MAF sensor apparatus 102 according to some implementations. In this example, as indicated at 502, the airflow inducted into the air induction system enters the grid mesh 112 of the grid component 110 on the inlet side 114. The grid mesh 112 may serve to smooth the airflow and dampen any disturbances in the airflow received from the filter enclosure or other upstream components. For example, the size of each opening 202 in the grid mesh 112 may be selected to be small enough to laminarize the airflow through the mesh cell at the expected ranges of airflow velocity through the air induction system. However, it is desirable that the mesh cell openings 202 not be so small as to increase the velocity of flow to a substantially higher value that may result in the generation of vortices at the outlet side 116 of the grid component 110, which may cause the MAF sensor 140 to experience a high degree of disturbance or turbulence. In addition, the thickness of the grid component 110 may be selected to control the intensity and/or randomness of disturbances in the air induction system upstream of the MAF sensor apparatus, while also considering the amount of back pressure and the overall size of the MAF sensor apparatus 102 that may result from a grid component 110 having a substantial thickness.

The airflow may exit the grid component 110 and enter into the inlet opening 118 of the nozzle component 120 where the velocity of the airflow is increased by the nozzle as indicated at 504. The inlet opening 118 of the nozzle component 120 has the same approximate diameter as the inner wall 505 of the MAF apparatus housing 104, which may also be a similar diameter to the air induction pipe (duct) of the air induction system (not shown in FIG. 5).

The nozzle component 120 has a generally conical inner surface so that a diameter of the outlet opening 124 of the nozzle 120 is a smaller diameter than the diameter of the inlet opening 118. The nozzle component 120 increases the velocity of the airflow through the CFM apparatus 102 and helps to ensure that large vortices or other disturbances are not generated upstream of the MAF sensor 140.

Following exiting the nozzle component 120, the airflow is directed thru the focus component 128. In some cases, the focus component 128 may further increase the velocity of the airflow, as indicated at 506, while also smoothing the airflow that will contact the MAF sensor 140 before the airflow reaches the MAF sensor 140.

The airflow at 506 that reaches the air inlet portion 142 on the lower part of the MAF sensor 140 may have a generally laminar flow. The components 110, 120, and 128 tend to smooth out any vortices or other disturbances that may be have been introduced into the airflow upstream of the MAF sensor apparatus 102. Furthermore, the focus component 128 may be located a first distance D1 from the outlet opening 124 of the nozzle component 120, which may provide space for any small vortices to smooth out before passing through the focus 128. As one example, the distance D1 may be between 1 and 10 cm.

Additionally the inlet portion 142 of the MAF sensor 140 may be spaced a distance D2 from the outlet side 136 of the focus member 130. The distance D2 may also provide space for any small vortices to smooth out before the airflow impinges on the air inlet portion 142 of the MAF sensor 140. As one example, the distance D2 may be between 2 and 15 cm. In addition, the grid component 110 may be spaced at a distance D3 from the nozzle component 120. Alternatively, in other examples, the distance D3 is eliminated and the grid component 110 may be positioned immediately adjacent to the nozzle component 120. As one example, the distance D3 may be from 0 to 15 cm.

Additionally, a velocity profile 508 of the airflow at 506 may be generally constant and centered on a centerline 509 of a bore 510 of the housing 104 regardless of the velocity of the airflow during low speed or high speed airflow, and regardless of the upstream configuration of the air induction system in which the MAF sensor apparatus 102 is installed. After the airflow passes the MAF sensor 140, as indicated at 512, the airflow may be directed to the engine. Further, in some cases, the positions of the nozzle component 120 and the first grid component 110 may be reversed such that the first grid component 110 is downstream of the nozzle component 120. Further, in some examples, there may be the space corresponding to distance Ds between the first grid component 110 and the nozzle component 120, while in other examples there might not be a space, as discussed additionally below.

Figure 6:
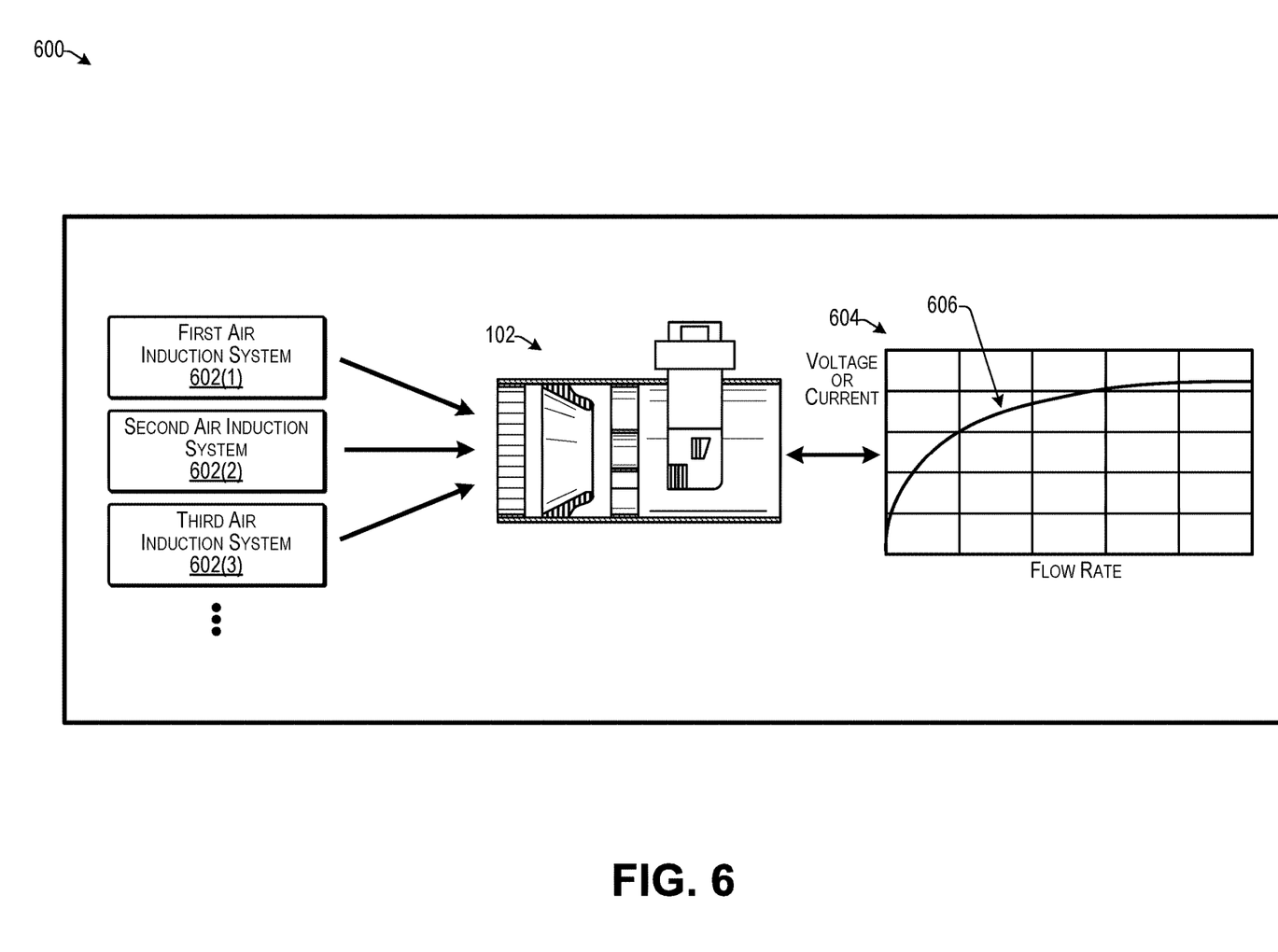
FIG. 6 illustrates an example of calibration information for the MAF sensor apparatus according to some imitations.

FIG. 6 illustrates an example 600 of calibration information for the MAF sensor apparatus 102 according to some imitations. In this example, a plurality of air induction systems 602(1), 602(2), 602(3), . . . , may incorporate the MAF apparatus 102 for measuring mass airflow rate. The MAF sensor apparatus 102 may be calibrated for one of the air induction systems 602, or for a different air induction system (not shown in FIG. 6), to generate calibration information 604. The calibration information 604 may include a master transfer function (MTF) curve 606. As one example, the MTF curve 606 may indicate a relationship between a measured voltage or measured current and an airflow rate, such as in grams/second or kilograms per hour. Accordingly, based on the MTF curve 606, for any measured voltage (frequency output, digital output (i.e. SENT/LIN) or current output) measured by the MAF sensor, the mass flow rate may be determined. In other alternatives, the MTF may be determined based on different parameters, as will be apparent to those of skill in the art having the benefit of the disclosure herein. After the calibration information 604 has been initially determined for the MAF sensor apparatus 102, the same calibration information 604 may be used for any of the air inductions systems 602(1), 602(2), 603(3), . . . , without performing calibration for using of the MAF sensor apparatus with each different air induction system.

Figure 7:
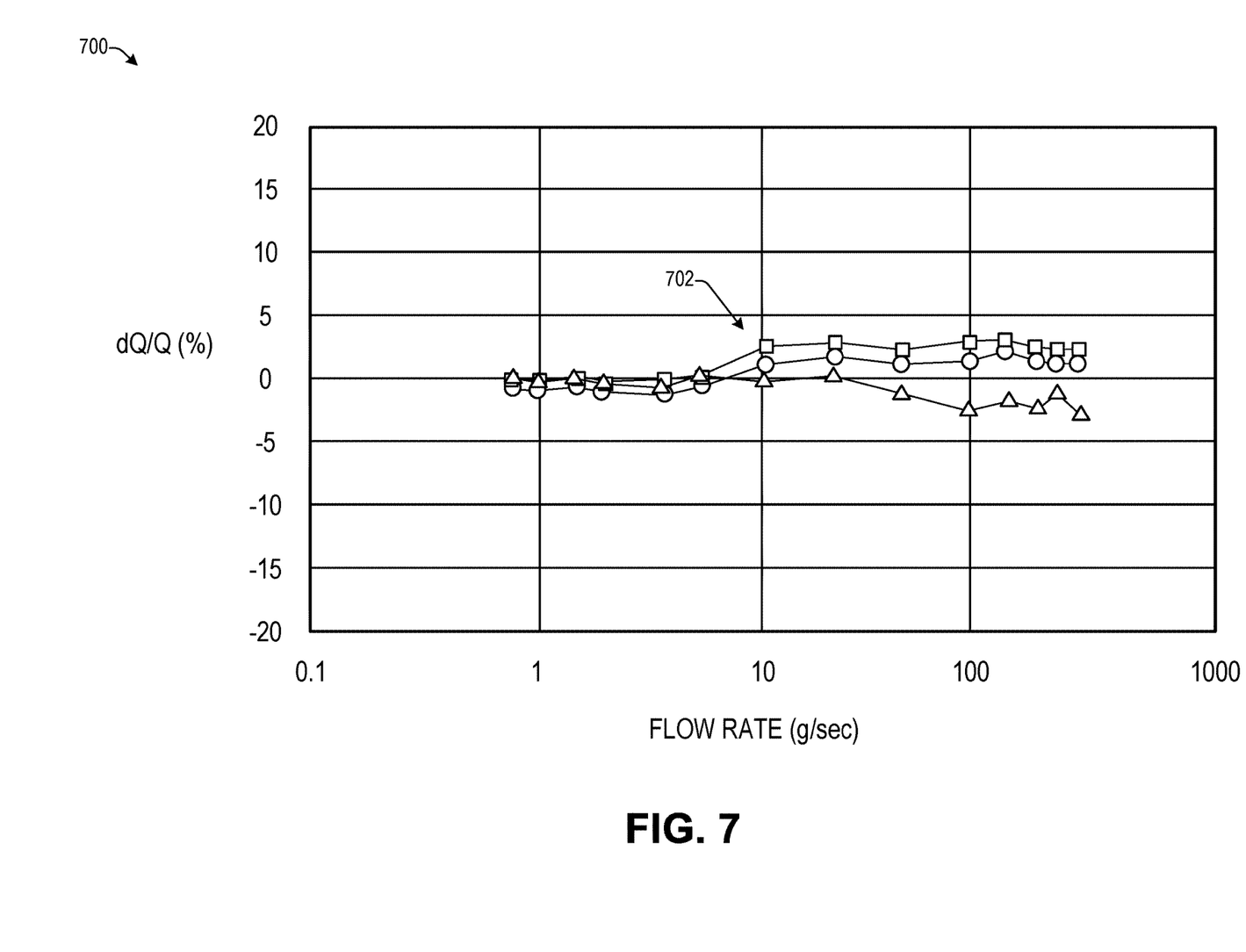
FIG. 7 illustrates an example graph showing change of measured flow (dQ/Q) as a function of flow rate according to some implementations.

FIG. 7 illustrates an example graph 700 showing dQ/Q as a function of flow rate according to some implementations. For example, a standard output measurement for the MAF sensor may be dQ/Q, where Q is the mass of air, e.g., in grams, and dQ/Q is the change of measured flow at a constant mass flow rate. Typically, many flow tests are required to complete an air induction system test requirement in order to determine a mass transfer output curve that can fairly represent for all the samples considered for the test. All the samples that are tested are desired to have a dQ/Q value that lies within a specific range. Apart from calculating dQ/Q for the given samples, the calibration tests also typically include calculating the signal noise involved in the measurements, as discussed additionally below with respect to FIG. 8.

Theoretically, all the measurements taken by the hot wire MAF sensor for a specific mass flow rate should be the same. However, factors such as turbulence in the flow, conduction along the wire, etc., may contribute to a certain amount of signal noise. In some examples, measuring signal noise may involve recording the readings from the MAF sensor for a specified mass flow rate over a given interval of time and then calculating the standard deviation from the measurements.

Conventional MAF sensor designs have a high dQ/Q ratio and high signal-to-noise ratios. A high dQ/Q ratio indicates a high part-to-part variation in the mass flow rate reading determined by the MAF sensor. A high dQ/Q ratio may necessitate recalibration and/or may lead to complicated engine management control strategies and/or diagnostics to reduce exhaust emissions and control fuel economy. Further, a high signal-to-noise ratio indicates that there exists high signal noise, which makes the reading of the MAF sensor particularly unreliable. For example, conventional airflow sensors may have a large signal-to-noise ratio at low flow rates, such as up to 20%, and the signal-to-noise ratio may reduce to about 5% at very high airflow rates.

The MAF sensor apparatus herein reduces the dQ/Q ratio, may minimize the change of measured flow (dQ/Q) in each induction system. Further, by eliminating or significantly reducing the signal noise, i.e., the signal-to-noise ratio, the MAF sensor apparatus herein enables a cleaner signal from the flow sensor and this in turn results in reliable output from the sensor. Accordingly, the MAF sensor apparatus herein may have a low dQ/Q ratio and low signal-to-noise ratio at all expected airflow rates through the air induction systems.

The example graph 700 of FIG. 7 illustrates example results 702 for the MAF sensor apparatus herein. The results 702 indicate that the dQ/Q ratio, which has previously been determined for conventional MAF sensors to be about 90 percent for low flow rates and about 20 percent for high flow rates, is around 5 percent for some implementations of the MAF sensor apparatus herein. This decrease in the dQ/Q ratio indicates that the MAF sensor apparatus herein has increased robustness and, for a given air induction system, the variation in the reading output by the MAF sensor apparatus may be minimal.

Figure 8:
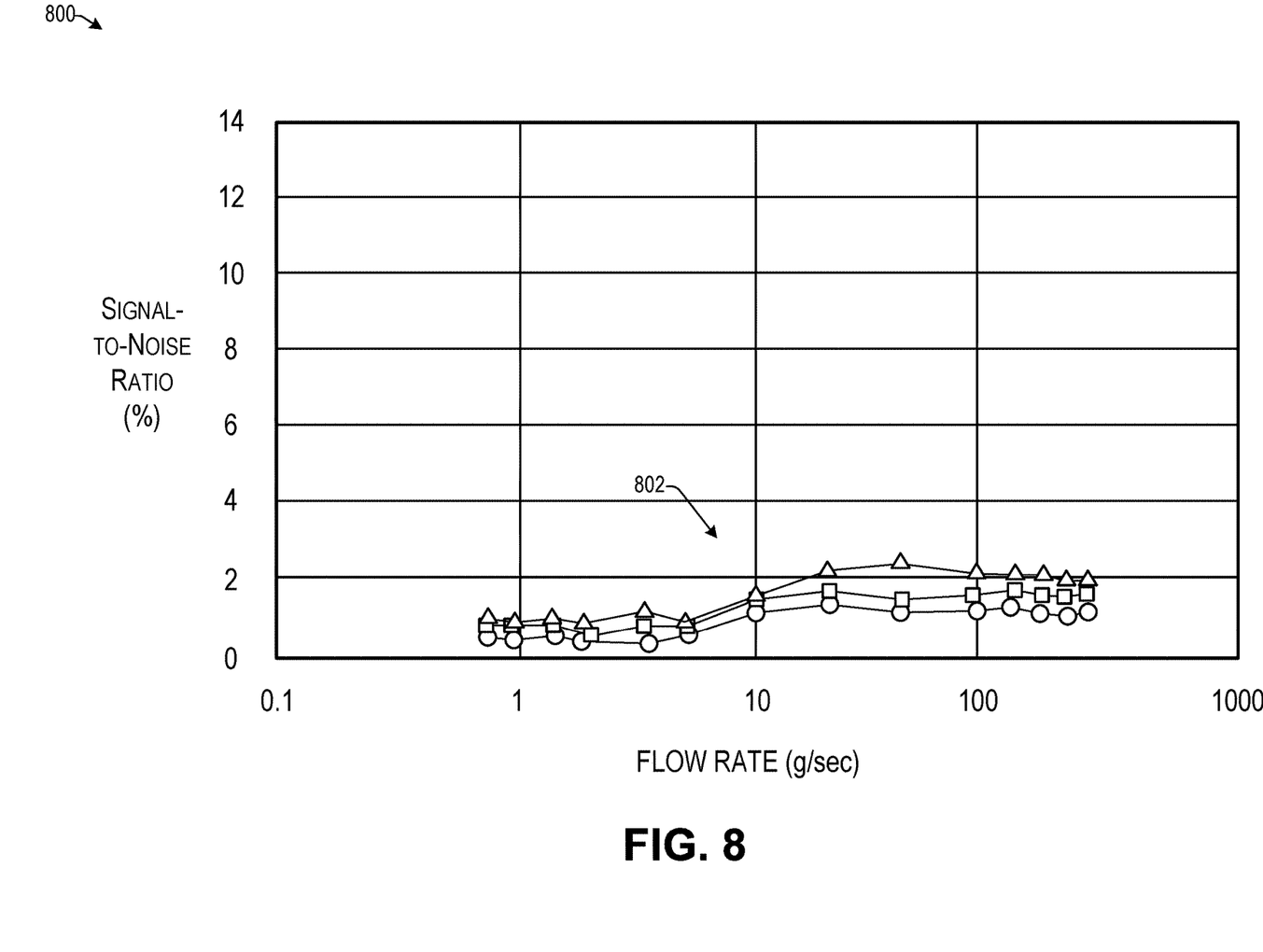
FIG. 8 illustrates an example graph showing signal-to-noise ratio as a function of flow rate according to some implementations.

FIG. 8 illustrates an example graph showing signal-to-noise ratio as a function of flow rate according to some implementations. In this example, signal-to-noise ratio is based on the standard deviation of the sensor output and primarily depends on the flow conditions and turbulence present in the air when a specific packet of air molecules pass through the sensor at an instant of time. Implementations herein keep the flow around the sensor laminar. This is useful, especially in the case of low velocity flows at which the sensor output is low and the signal-to-noise ratio may be high.

FIG. 8 illustrates at 802 that the signal-to-noise ratio, which can be as high as 10% has come down to around 2% by implementation of the MAF sensor apparatus herein. This decrease in the signal-to-noise ratio indicates that the signal noise is significantly reduced compared to conventional MAF sensor arrangements in an air induction system. This result further indicates that the air flow sensed by the MAF sensor apparatus herein is less turbulent than in the conventional MAF sensor arrangements.

Figure 9:
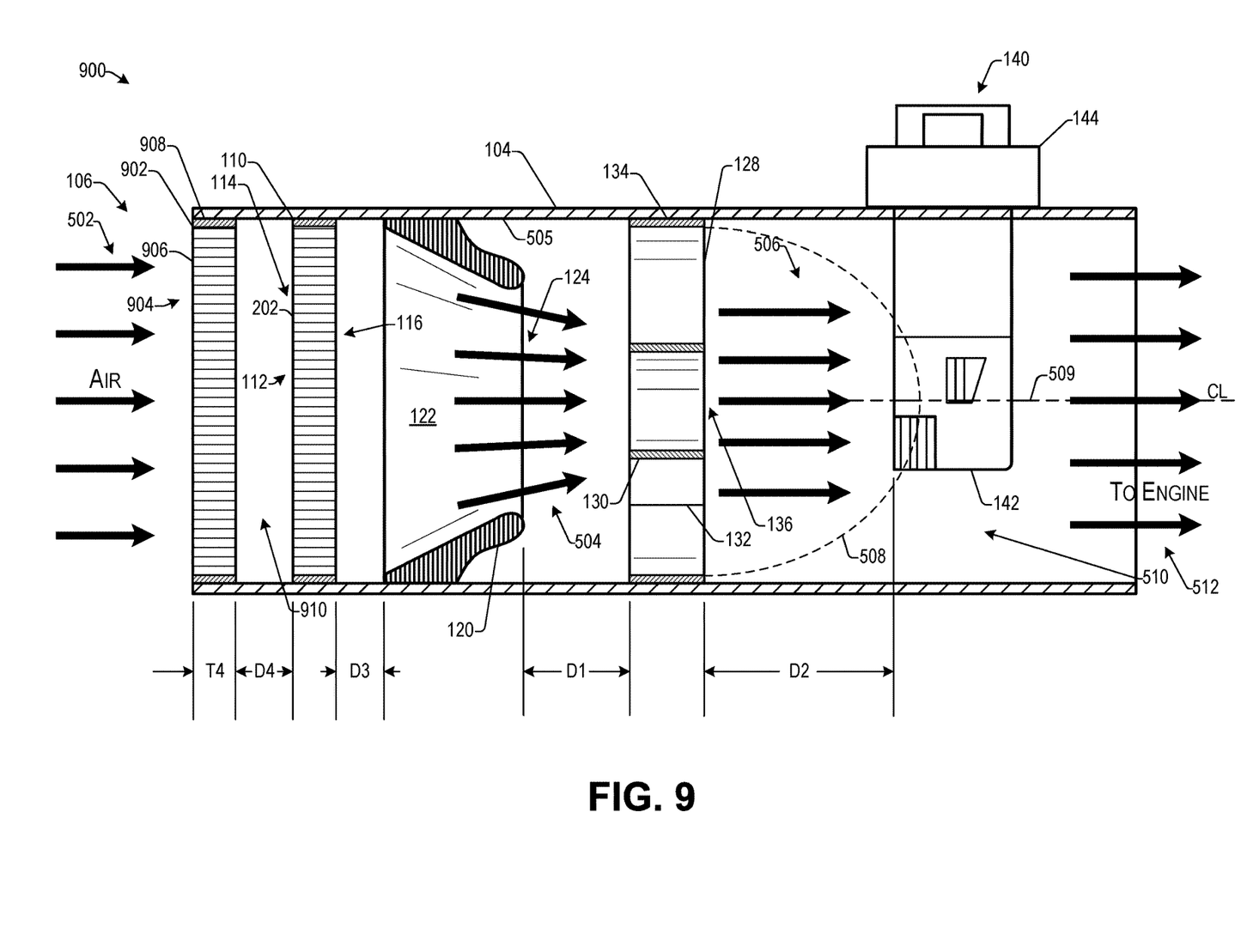
FIG. 9 illustrates a cross-sectional view of an example MAF sensor apparatus according to some implementations.

FIG. 9 illustrates a cross-sectional view of an example MAF sensor apparatus 900 according to some implementations. In this example, a second grid component 902 includes a grid mesh 904 having mesh openings 906 and an outer ring 908. In some examples, the size of the mesh openings 906 and a thickness T4 of the grid component 902 may be the same as that discussed above for the first grid component 110. In other examples, the size of the mesh openings 906 may be larger and the thickness T4 may be less than the thickness T1 of the first grid component 110. For example, at this location in the MAF apparatus 900, the mesh openings may be larger to reduce backpressure, such as twice as large as the openings 202 of the first grid component 110 and/or the thickness T4 of the grid component 902 may be less than half of the thickness T1, while still providing a smoother airflow at an outlet side 910. Further, in some examples, the second grid component 902 may be a wire mesh. Additionally, in some examples one or both of the grid components 110 and 902 and in some cases the nozzle 120 might not be contained in the housing 104, but may be located farther upstream from the target 128 and the MAF sensor 140, such as in the duct 103 discussed above with respect to FIG. 1. In either event, the second grid component 902 may be spaced from the first grid component 110 by a distance D4. As one example, D4 may be greater than 5 mm and less than 15 cm. Further, in some cases, the positions of the nozzle component 120 and the first grid component 110 may be reversed such that the first grid component 110 is downstream of the nozzle component 120 and the second grid component 902 is upstream of the nozzle component 120.

Figure 10:
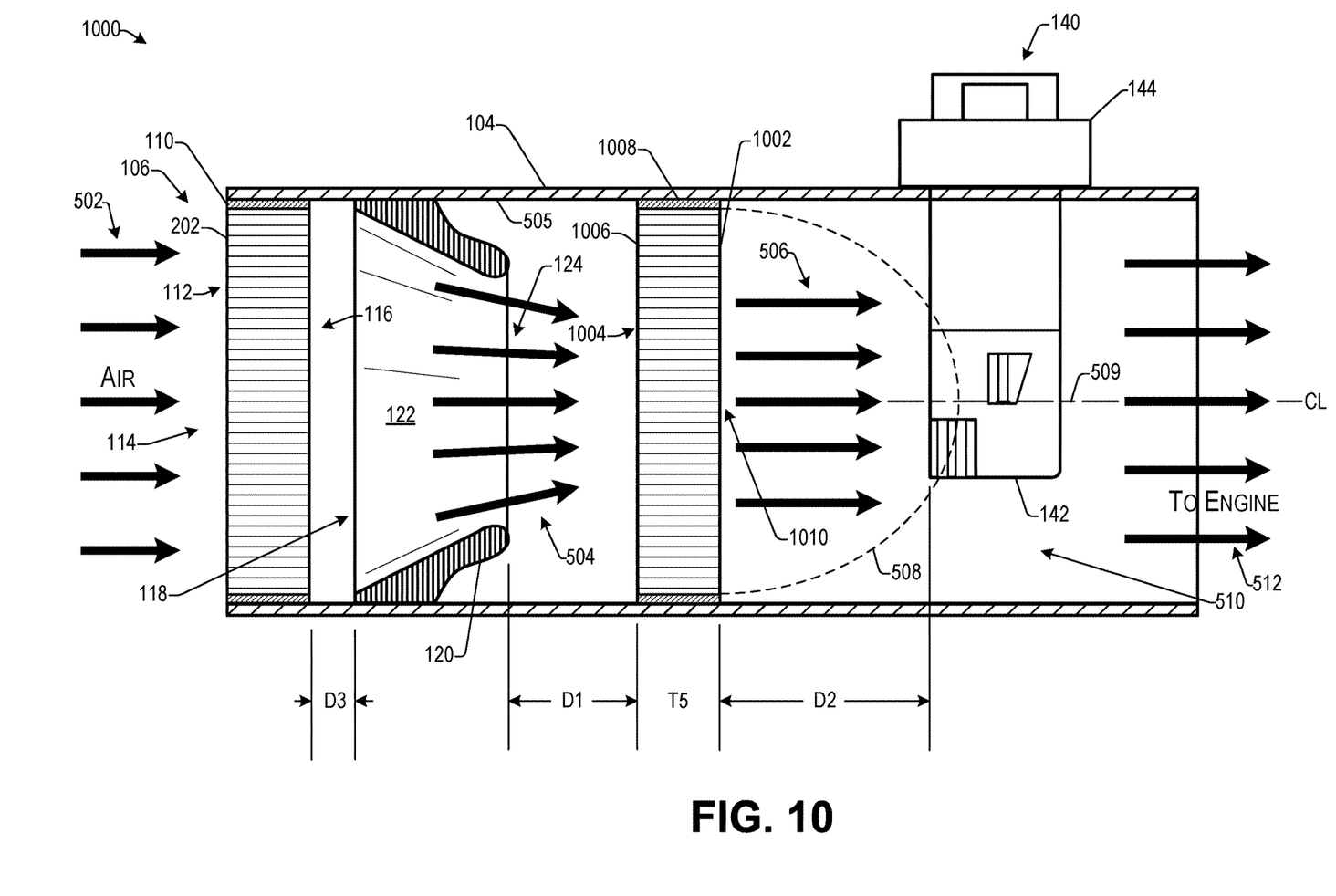
FIG. 10 illustrates a cross-sectional view of an example MAF sensor apparatus according to some implementations.

FIG. 10 illustrates a cross-sectional view of an example MAF sensor apparatus 1000 according to some implementations. In this example, the focus component is replaced by a second grid component 1002. The second grid component 1002 includes a grid mesh 1004 having mesh openings 1006 and an outer ring 1008. In some examples, the size of the mesh openings 1006 and a thickness T5 of the grid component 1002 may be the same as that discussed above for the first grid component 110. In other examples, the size of the mesh openings 1006 may be larger and the thickness T5 may be less than the thickness T1 of the first grid component 110. For example, as the flow is already more laminar at this location in the MAF apparatus 1000, the mesh openings may be larger to reduce backpressure, such as twice as large as the openings 202 of the first grid component 110 and/or the thickness T5 of the grid component 1002 may be less than half of the thickness T1, while still providing laminar flow at an outlet side 1010. Further, in some examples, the second grid component 1002 may be a wire mesh having a thickness of the wire used to construct the wire mesh. In addition, in this example, or any of the other examples discussed herein, the nozzle component 120 may be spaced from the first grid component 110 by the distance D3. Additionally, in some examples, the position of the nozzle component 120 and the first grid component 110 may be reversed so that the nozzle component 120 is upstream of the first grid component 110. Further, while several example configurations are illustrated herein, numerous variations will be apparent to those of skill in the art having the benefit of the disclosure herein.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:
1. A mass airflow sensor apparatus comprising:
   a housing having a tubular bore for passage of air;
   an airflow sensor disposed at least partially within the tubular bore, the airflow sensor configured to measure a flow rate of air flowing past the airflow sensor;
   a focus component disposed upstream of the mass airflow sensor, the focus component including a cylindrical tubular focus member suspended within the tubular bore;
   a nozzle disposed upstream of the focus component, the nozzle including a conical inner surface angled toward a center of the tubular bore;
   a grid component disposed upstream of the focus component, the grid component including a grid mesh including a plurality of openings for smoothing a flow of air flowing toward the airflow sensor; and
   an exit side of the cylindrical tubular focus member of the focus component is spaced upstream from an inlet of the airflow sensor by a distance between 2 cm and 15 cm and is in line with the inlet of the airflow sensor.

2. The mass airflow sensor apparatus as recited in claim 1, wherein the grid component is disposed upstream of and adjacent to an inlet opening of the nozzle.

3. The mass airflow sensor apparatus as recited in claim 1, wherein the cylindrical tubular focus member has an inner diameter that is smaller than a diameter of an outlet opening of the nozzle.

4. The mass airflow sensor apparatus as recited in claim 1, wherein the nozzle is disposed downstream of the grid component, the grid component being a first grid component, the mass airflow sensor apparatus further comprising a second grid component disposed between 0.5 cm and 15 cm upstream of the first grid component, the second grid component configured to induce less backpressure than the first grid component.

5. The mass airflow sensor apparatus as recited in claim 4, wherein the second grid component disposed upstream of the first grid component has grid openings that are larger in at least one of width or height than grid openings of the first grid component.

6. The mass airflow sensor apparatus as recited in claim 1, wherein the cylindrical tubular focus member is suspended within the center of the tubular bore by at least one strut extending inward from a wall of the tubular bore, the strut being spaced between 2 cm to 15 cm upstream from the inlet of the mass airflow sensor.

7. The mass airflow sensor apparatus as recited in claim 1, wherein the plurality of openings in the grid mesh have a width and a height, wherein at least one of the width or the height is between 4 and 7 mm.

8. The mass airflow sensor apparatus as recited in claim 4, wherein a thickness of the second grid component is less than a thickness of the first grid component.

9. A mass airflow sensor apparatus comprising:
   a housing having a tubular bore for passage of air;
   an airflow sensor disposed at least partially within the tubular bore, the airflow sensor configured to measure a flow rate of air flowing past the airflow sensor;
   a focus component disposed upstream of the mass airflow sensor, the focus component including a cylindrical tubular focus member suspended within the tubular bore;
   a nozzle disposed upstream of the focus component, the nozzle including a conical inner surface angled toward a center of the tubular bore;
   a first grid component disposed upstream of the focus component, the first grid component including a grid mesh including a plurality of openings for smoothing a flow of air flowing toward the airflow sensor, wherein the nozzle is disposed downstream of the first grid component;
   a second grid component disposed between 0.5 cm and 15 cm upstream of the first grid component, the second grid component at least one of:
      having grid openings that are larger than grid openings of the first grid component; or having a thickness that is less than a thickness of the first grid component; and wherein an exit side of the cylindrical tubular focus member of the focus component is spaced upstream from an inlet of the airflow sensor by a distance between 2 cm and 15 cm.

10. The mass airflow sensor apparatus as recited in claim 9, wherein the thickness of the second grid component is less than the thickness of the first grid component to induce less backpressure than the first grid component.

11. The mass airflow sensor apparatus as recited in claim 9, wherein the grid openings of the second grid component are at least twice as large as the grid openings of the first grid component to induce less backpressure than the first grid component.

12. The mass airflow sensor apparatus as recited in claim 9, wherein the second grid component is constructed of wire and has a thickness corresponding to a thickness of the wire.

13. The mass airflow sensor apparatus as recited in claim 9, wherein the cylindrical tubular focus member is suspended within the center of the tubular bore by at least one strut extending inward from a wall of the tubular bore, the strut being spaced between 2 cm to 15 cm upstream from an inlet of the mass airflow sensor.

14. A mass airflow sensor apparatus comprising:
a housing having a tubular bore for passage of air;
an airflow sensor disposed at least partially within the tubular bore, the airflow sensor configured to measure a flow rate of air flowing past the airflow sensor;
a focus component disposed upstream of the mass airflow sensor, the focus component including a cylindrical tubular focus member suspended within the tubular bore;
a nozzle disposed upstream of the focus component, the nozzle including a conical inner surface angled toward a center of the tubular bore;
a first grid component disposed upstream of the focus component, the first grid component including a grid mesh including a plurality of openings for smoothing a flow of air flowing toward the airflow sensor, wherein the nozzle is disposed downstream of the first grid component;
a second grid component disposed between 0.5 cm and 15 cm upstream of the first grid component; and
an exit side of the cylindrical tubular focus member of the focus component is spaced upstream from an inlet of the airflow sensor.

15. The mass airflow sensor apparatus as recited in claim 14, wherein the exit side of the cylindrical tubular focus member is spaced between 2 cm and 15 cm upstream from the inlet the airflow sensor.

16. The mass airflow sensor apparatus as recited in claim 14, wherein the second grid component disposed upstream of the first grid component has grid openings that are larger in at least one of width or height than grid openings of the first grid component.

17. The mass airflow sensor apparatus as recited in claim 14, wherein a thickness of the second grid component is less than a thickness of the first grid component.

18. The mass airflow sensor apparatus as recited in claim 14, wherein an exit side of the cylindrical tubular focus member of the focus component is spaced upstream from the airflow sensor by a distance between 2 cm and 15 cm from an inlet of the airflow sensor.

19. The mass airflow sensor apparatus as recited in claim 14, wherein the cylindrical tubular focus member is suspended within the center of the tubular bore by at least one strut extending inward from a wall of the tubular bore, the strut being spaced between 2 cm to 15 cm upstream from an inlet of the mass airflow sensor.

* * * * *